J. J. Lurvey,
Harvester Cutter.
No. 83,185. Patented Oct. 20, 1868.
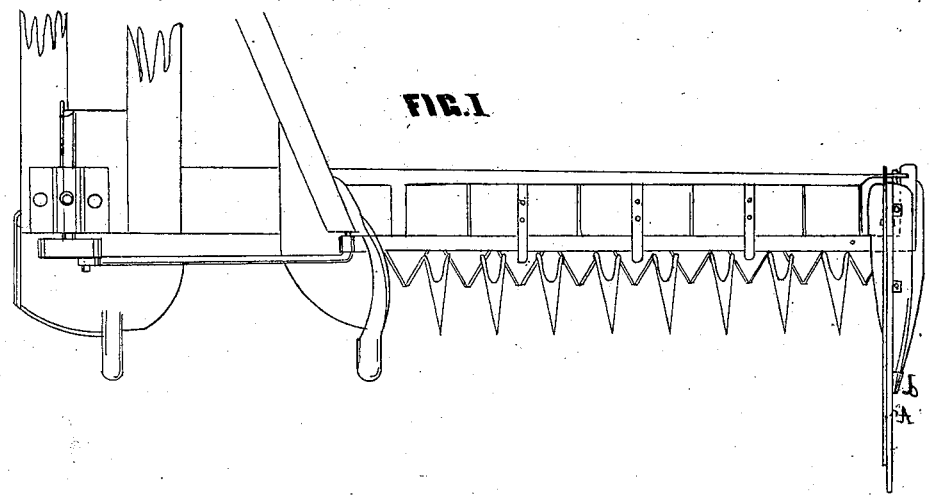
FIG. I
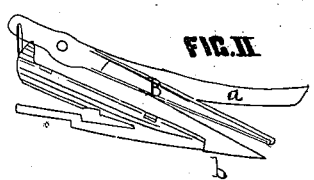
FIG. II
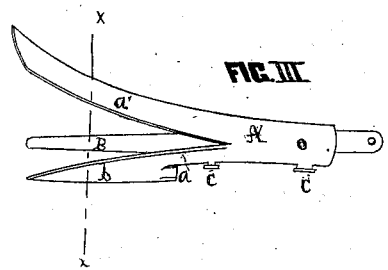
FIG. III     FIG. IV
Witnesses
Fred. Thomas
C. Brown
Inventor
J. J. Lurvey
per H. W. Beadle Atty
by C. Brown

JOSEPH J. LURVEY, OF NORTH PRAIRIE, WISCONSIN.

Letters Patent No. 83,185, dated October 20, 1868.

IMPROVEMENT IN DIVIDERS FOR HARVESTERS.

The Schedule referred to in these Letters Patent and making part of the same.

*To all whom it may concern:*

Be it known that I, JOSEPH J. LURVEY, of North Prairie, in the county of Waukesha, and State of Wisconsin, have invented new and useful Improvements in Harvesters; and I do hereby declare that the following is a full and exact description of the same, reference being had to the accompanying drawings, and to the letters of reference marked thereon.

This invention consists of a divider, of construction hereinafter more fully described, which is adapted to the reaper-bar of reapers and mowers, for the purpose of dividing the lodged grass or grain from that which is cut by the machine.

Figure 1 is a plan view of the divider and reaper-bar, showing the manner of attaching the former to the machine;

Figure 2 represents a perspective view of the shoe, with the divider attached;

Figure 3, a side view of the same without the shoe; and

Figure 4, a section through the line x–x, fig. 3.

The same letters in all the figures refer to identical parts.

In the drawings, A represents the bifurcated cutter. The lower arm *a* has, near its extremity, and on the inner side, a socket, *b*, fitted to slip over the shoe on the end of the bar of the machine to which it is attached. Further back, and arranged at suitable distances, are ears *c c*, perforated to admit screws, by which the device may be more firmly secured to the reaper or mower.

The upper arm *a'* is curved upward, and is of suitable length and curve for the proposed work. The inner edges of these arms are sharpened by a bevel on the inner side, and should be made of good cutting-metal.

The vibrating arm is represented by B. This is a plain, straight knife, brought to an edge on both sides by bevels on the outer surface, and is perforated near the rear end for pivoting to the bifurcated part A. When pivoted to the part A, the construction and arrangement are such that the vibration of the double-edged arm B, between the two arms *a a'* of the bifurcated part, causes the device to cut on both sides, in the same manner as shears. This double-edged knife B may be operated either by attaching it, by means of a bell-crank and link, to the sickle-bar, or by separate shaft and gearing from the wheel of the reaper or mower. In cutting lodged grain, or clover or other grass, this device may be readily attached to the machine, and being moved precisely as the other cutters are, easily separates any part of the grass or grain which may have been bent over and lodged on that part through which the bar is cutting. Thus the machine moves along easily and without pulling, leaving a smooth-cut surface for its next passage.

I do not confine myself to this particular form of bifurcated cutter, nor to the precise mode of attachment, though I consider these the best. They may be varied to suit different machines and circumstances, without departing from the spirit of my invention.

Having thus fully described my invention,

What I claim, and desire to secure by Letters Patent of the United States, is—

The described divider, when constructed of the bifurcated part and the vibrating cutting-arm, the whole being attached and operated substantially as and for the purpose set forth.

This specification signed and witnessed, this 6th day of August, 1868.

JOSEPH J. LURVEY.

Witnesses:
T. C. DOUSMAN,
LAURA C. DOUSMAN.